(No Model.)

G. C. GILLESPIE.
DEVICE FOR CUTTING SQUARE HOLES.

No. 477,528. Patented June 21, 1892.

WITNESSES:
Harvey C. Conover.
William S. Gillespie.

INVENTOR
George Curtis Gillespie

UNITED STATES PATENT OFFICE.

GEORGE CURTIS GILLESPIE, OF BROOKLYN, NEW YORK.

DEVICE FOR CUTTING SQUARE HOLES.

SPECIFICATION forming part of Letters Patent No. 477,528, dated June 21, 1892.

Application filed December 18, 1890. Serial No. 375,067. (No model.)

*To all whom it may concern:*

Be it known that I, GEORGE CURTIS GILLESPIE, a citizen of the United States, and a resident of Brooklyn, in the county of Kings and State of New York, have invented certain new and useful Improvements in a Tool or Device for Cutting Square Holes, of which the following is a specification.

My object is to provide a tool or device to cut square holes—one that will perform the work to an unlimited depth without other tool manipulation and that may be portable and readily attached to devices now at hand for its operation—as, for example, ball-braces, bit-stocks, &c. This object I accomplish by employing two sprocket-wheels separated by an extension rod or stock of less diameter than said wheels, and an endless belt of metallic teeth or cutters of somewhat greater width than said wheels, made to revolve around them by suitable gearing or other contrivance, the whole to be held in position by a handle-blade encircling the said stock and resting on the wood or other substance to be cut, through which said stock may slide as the device sinks deeper into the wood, due to the revolution and cutting of said bladed belt, operated by gearing at, say, its upper end.

The extension stock is formed of, preferably, three members, a tension-nut having projected from one end a right-hand screw and from the other end a left-hand screw, both extending into and forming a part of the two end members of the stock, where, by turning said nut, the stock as a whole may be lengthened or shortened, and the belt tightened, loosened, replaced, or removed with facility.

The general construction of my tool or device for cutting square holes will be readily understood by reference to the accompanying drawings, in which—

Figure 1:
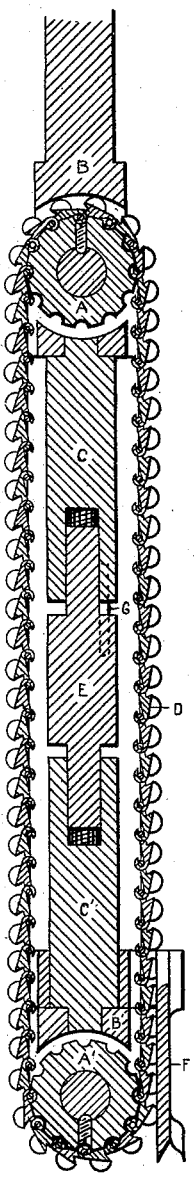
Figure 2:
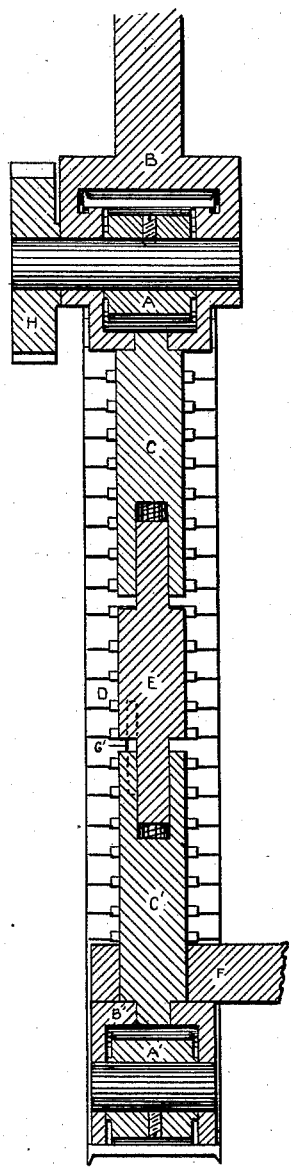
Figure 3:
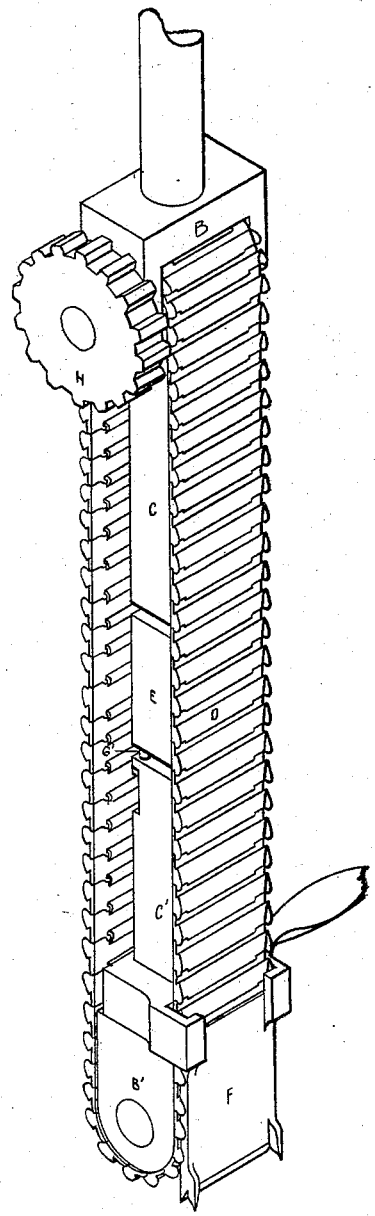

Figure 1 is a vertical section taken at right angles to the axles of the above-mentioned wheels. Fig. 2 is a vertical section taken parallel with the axles of said wheels. Fig. 3 is a perspective view of the device.

Similar letters indicate similar parts in all figures.

A and A' are the wheels, separated and held in alignment by the bearing-blocks B and B' and the stock or rod C and C'.

D is an endless-bladed belt passing around wheels A and A' and bearing-blocks B and B', said bladed belt being composed of links so closely fitting one another as to form to all intents and purposes a solid surface, each of said links having extended from their ends vertical spurs for severing the grain in two places, as shown, and lateral gouging-blades to clear the space between the spurs. These latter may be parallel with the pivot or turning-axle of the link, or at a slight angle with it, that the same may act as a cutter as well as a gouge.

E is a tension-nut with right and left hand screws on its ends, by turning which the belt D is tightened or loosened through its action on the rod C and C' and the bearing-blocks B and B', as shown.

F is a handle-blade encircling stock C and C' and belt D, and extending in a sharpened knife-like edge to the surface to be cut. Said edge by means of pressure on its handle holds the device rigidly in position during its manipulation.

G and G' are pressure-spring nut-locks operated from the exterior of rod G and G', passing through holes in nut E and rod C and C' to prevent the same from getting out of position after being set, and may be of any form suitable for the purpose.

H is a gear-wheel for imparting motion to the belt D.

The manipulation of my device consists in sinking the sharpened edge and teeth of handle-blade F into the substance to be cut, (preferably with the grain,) holding the same rigidly while the cutting-belt is made to revolve by means of the gear H. The belt passing down on one side severs the grain by its side cutters, and the intermediate ones cut and bring the wood or other substance up and out over the top of blade F at the other side. This device may be made to cut oblong holes by changing the proportions of the wheels in its manufacture, thus increasing their diameters or diminishing their width and the width of the belt. Further, holes or polygons of more than three sides may be cut *ad infinitum* by cutting each side separately.

Having now described the construction and operation of my tool or device for cutting square holes, what I claim as my invention, and desire to secure by United States Letters Patent, is—

1. In a tool or device for cutting square holes, the combination of a stock separating two sprocket-wheels with an endless-bladed belt or chain of cutters so formed that the rear portion of one link shall so closely fit an aperture in the preceding portion of its follower as to form in all its positions a solid continuity of metallic belt regardless of width, each of said links having extended across its width a lateral gouging-blade provided at both ends with vertical spurs or cutters projecting beyond the cutting-edge of the lateral blade, substantially as shown and described.

2. In a tool or device for cutting square holes, the combination of a stock separating sprocket-wheels carrying an endless-bladed belt, with a guide or handle-blade encircling said stock so formed that the stock may slide easily through it and having at one side a handle, and further provided with a blade and teeth projecting downward, the whole to act as guide and support, substantially as shown and described.

3. In a tool or device for cutting square holes, the combination of sprocket-wheels turning in bearing-blocks held in position by an extension rod or stock which is separated and made continuous by a tension-nut having extended from its ends right and left hand screws working in and forming a part of said stock, around said sprocket-wheels a continuously solid-bladed belt being made to pass, and the whole device provided with a guide or support encircling the stock with handle and anchor-blade, all substantially as shown and described.

Signed at Brooklyn, in the county of Kings and State of New York, this 16th day of December, A. D. 1890.

GEORGE CURTIS GILLESPIE.

Witnesses:
HARVEY C. CONOVER,
WILLIAM S. GILLESPIE,
A. P. MORONEY.